(12) United States Patent
Cheluvaraja et al.

(10) Patent No.: US 10,789,962 B2
(45) Date of Patent: Sep. 29, 2020

(54) SYSTEM AND METHOD TO CORRECT FOR PACKET LOSS USING HIDDEN MARKOV MODELS IN ASR SYSTEMS

(71) Applicant: Genesys Telecommunications Laboratories, Inc., Chantilly, VA (US)

(72) Inventors: Srinath Cheluvaraja, Carmel, IN (US); Ananth Nagaraja Iyer, Carmel, IN (US); Aravind Ganapathiraju, Hyderabad (IN); Felix Immanuel Wyss, Zionsville, IN (US)

(*) Notice: Subject to any disclaimer, the term of this patent is extended or adjusted under 35 U.S.C. 154(b) by 19 days.

(21) Appl. No.: 16/186,851

(22) Filed: Nov. 12, 2018

(65) Prior Publication Data

US 2019/0080701 A1    Mar. 14, 2019

Related U.S. Application Data

(62) Division of application No. 14/638,198, filed on Mar. 4, 2015, now Pat. No. 10,157,620.

(Continued)

(51) Int. Cl.

| | |
|---|---|
| *G10L 19/005* | (2013.01) |
| *G10L 15/14* | (2006.01) |
| *G10L 19/00* | (2013.01) |
| *G10L 15/08* | (2006.01) |
| *G10L 15/20* | (2006.01) |
| *G10L 15/02* | (2006.01) |

(Continued)

(52) U.S. Cl.
CPC ............ *G10L 19/005* (2013.01); *G10L 15/08* (2013.01); *G10L 15/14* (2013.01); *G10L 15/142* (2013.01); *G10L 15/20* (2013.01); *G10L 15/02* (2013.01); *G10L 25/18* (2013.01); *G10L 25/21* (2013.01); *G10L 2015/025* (2013.01); *G10L 2019/0012* (2013.01)

(58) Field of Classification Search
CPC .... G10L 15/142; G10L 19/005; H04L 1/0054
USPC ................. 704/256.1, 256.6, 270.1; 714/747
See application file for complete search history.

(56) References Cited

U.S. PATENT DOCUMENTS

| | | |
|---|---|---|
| 5,012,518 A | 4/1991 | Liu |
| 5,758,319 A | 5/1998 | Knittle |

(Continued)

FOREIGN PATENT DOCUMENTS

WO    2006/079349 A1    8/2006

OTHER PUBLICATIONS

Borgstrom, Bengt J., et al. "HMM-Based Reconstruction of Unreliable Spectrographic Data for Noise Robust Speech Recognition." IEEE Trans. Audio, Speech & Language Processing 18.6, Aug. 2010, pp. 1612-1623. (Year: 2010).*

(Continued)

*Primary Examiner* — James S Wozniak

(57) ABSTRACT

A system and method are presented for the correction of packet loss in audio in automatic speech recognition (ASR) systems. Packet loss correction, as presented herein, occurs at the recognition stage without modifying any of the acoustic models generated during training. The behavior of the ASR engine in the absence of packet loss is thus not altered. To accomplish this, the actual input signal may be rectified, the recognition scores may be normalized to account for signal errors, and a best-estimate method using information from previous frames and acoustic models may be used to replace the noisy signal.

6 Claims, 3 Drawing Sheets

Related U.S. Application Data

(60) Provisional application No. 61/947,841, filed on Mar. 4, 2014.

(51) Int. Cl.
*G10L 25/18* (2013.01)
*G10L 25/21* (2013.01)

(56) References Cited

U.S. PATENT DOCUMENTS

| | | | |
|---|---|---|---|
| 5,907,822 | A | 5/1999 | Prieto, Jr. |
| 6,298,085 | B1 | 10/2001 | Kondo |
| 6,356,701 | B1 | 3/2002 | Tanizawa |
| 6,633,846 | B1 | 10/2003 | Bennett et al. |
| 6,810,377 | B1 | 10/2004 | Ho |
| 6,993,483 | B1 | 1/2006 | Milner |
| 7,110,947 | B2 * | 9/2006 | Cox .................. G10L 15/02 704/236 |
| 7,519,535 | B2 | 4/2009 | Spindola |
| 7,873,064 | B1 | 1/2011 | Li |
| 8,532,985 | B2 | 9/2013 | Seltzer |
| 2001/0020280 | A1 | 9/2001 | Bastin |
| 2002/0046021 | A1 * | 4/2002 | Cox .................. G10L 15/02 704/229 |
| 2002/0054578 | A1 * | 5/2002 | Zhang ............... H04L 1/0001 370/328 |
| 2002/0133761 | A1 | 9/2002 | Wang |
| 2003/0099236 | A1 | 5/2003 | Wah |
| 2005/0058145 | A1 | 3/2005 | Florencio |
| 2006/0023706 | A1 | 2/2006 | Varma et al. |
| 2007/0055496 | A1 | 3/2007 | Kapilow et al. |
| 2007/0088540 | A1 | 4/2007 | Ohta |
| 2008/0046235 | A1 | 2/2008 | Chen |
| 2008/0086302 | A1 | 4/2008 | Krishnan |
| 2008/0133242 | A1 | 6/2008 | Sung |
| 2009/0070105 | A1 | 3/2009 | Ikegami |
| 2009/0132246 | A1 | 5/2009 | Zinser, Jr. |
| 2009/0171656 | A1 | 7/2009 | Kapilow |
| 2009/0180531 | A1 | 7/2009 | Wein |
| 2009/0306972 | A1 | 12/2009 | Opitz |
| 2010/0080292 | A1 | 4/2010 | Coulombe |
| 2010/0174537 | A1 | 7/2010 | Vos et al. |
| 2010/0280823 | A1 | 11/2010 | Shlomot |
| 2010/0312553 | A1 | 12/2010 | Fang |
| 2012/0101814 | A1 | 4/2012 | Elias |
| 2012/0116756 | A1 | 5/2012 | Wasserblat et al. |
| 2013/0144632 | A1 * | 6/2013 | Sung .................. G10L 19/005 704/503 |
| 2014/0249468 | A1 | 9/2014 | Nikkila |
| 2014/0330564 | A1 * | 11/2014 | Cox .................. G10L 15/02 704/238 |
| 2015/0255075 | A1 | 9/2015 | Cheluvaraja |
| 2016/0148618 | A1 | 5/2016 | Huang |

OTHER PUBLICATIONS

Carmona, José L., et al. "MMSE-Based Packet Loss Concealment for CELP-Coded Speech Recognition." IEEE Trans. Audio, Speech & Language Processing 18.6, Aug. 2010, pp. 1341-1353. (Year: 2010).*

Murthi, Manohar N., et al. "Packet loss concealment with natural variations using HMM." Acoustics, Speech and Signal Processing, 2006. ICASSP 2006 Proceedings. 2006 IEEE International Conference on. vol. 1. IEEE, May 2006, pp. 21-24. (Year: 2006).*

Rodbro, Christoffer A., et al. "Hidden Markov model-based packet loss concealment for voice over IP." IEEE Transactions on Audio, Speech, and Language Processing 14.5, Sep. 2006, pp. 1609-1623. (Year: 2006).*

International Search Report and Written Opinion dated Jul. 24, 2015 in related foreign application PCT/US15/18692 filed Mar. 4, 2015.

Koenig, et al. "A New Feature Vector for HMM-Based Packet Loss Concealment"; 17th European Signal Processing Conference (EUSIPCO 2009); Publication online, Aug. 28, 2009. Retrieved from internet: <URL: http:www.eurasip.org/Proceedings/Eusipco/Eusipco2009/contents/papers/1569191501.pdf> pp. 2519-2523.

Kheddar, Hamza, et al. "Implementation of interleaving methods on MELP 2.4 coder to reduce packet loss in the voice over IP (VoIP) transmission." Int. J. Eng. Res. Appl 5.3, Mar. 2015, pp. 1-4.

Korhonen, Jari, et al. "Schemes for error resilient streaming of perceptually coded audio." Acoustics, Speech, and Signal Processing, 2003. Proceedings. (ICASSP'03). 2003 IEEE International Conference on. vol. 5. IEEE, Apr. 2003, pp. 165-168.

Milner, Ben. "Robust speech recogntion in burst-like packet loss." Acoustics, Speech, and Signal Processing, 2001. Proceedings. (ICASSP'01). 2001 IEEE International Conference on. vol. 1. IEEE, May 2001, pp. 261-264.

Milner, Ben, and Alastair James. "Robust speech recognition over mobile and IP networks in burst-like packet loss." IEEE Transactions on Audio, Speech, and Language Processing 14.1, Jan. 2006, pp. 223-231.

Park, Nam In, et al. "Burst packet loss concealment using multiple codebooks and comfort noise for CELP-type speech coders in wireless sensor networks." Sensors 11.5, May 2011, pp. 5323-5336.

* cited by examiner

SYSTEM AND METHOD TO CORRECT FOR PACKET LOSS USING HIDDEN MARKOV MODELS IN ASR SYSTEMS

CROSS-REFERENCE TO RELATED APPLICATIONS

This application claims the benefit of U.S. Provisional Patent Application No. 61/947,841 "METHODS TO CORRECT FOR PACKET LOSS IN ASR SYSTEMS," filed in the United States Patent and Trademark Office on Mar. 4, 2014, the entire disclosure of which is incorporated by reference herein. This application is a divisional of U.S. patent application Ser. No. 14/638,198, "METHODS TO CORRECT FOR PACKET LOSS IN ASR SYSTEMS," filed in the United States Patent and Trademark Office on Mar. 4, 2015, the entire disclosure of which is incorporated by reference herein.

BACKGROUND

The present invention generally relates to telecommunications systems and methods, as well as automatic speech recognition systems. More particularly, the present invention pertains to the correction of packet loss within the systems.

SUMMARY

A system and method are presented for the correction of packet loss in audio in automatic speech recognition (ASR) systems. Packet loss correction, as presented herein, occurs at the recognition stage without modifying any of the acoustic models generated during training. The behavior of the ASR engine in the absence of packet loss is thus not altered. To accomplish this, the actual input signal may be rectified, the recognition scores may be normalized to account for signal errors, and a best-estimate method using information from previous frames and acoustic models may be used to replace the noisy signal.

In one embodiment, a method to correct for packet loss in an audio signal in an automatic speech recognition system comprising reconstructing the signal using linear interpolation from preceding and succeeding frames of audio is presented, wherein the linear interpolation comprises the steps of: determining spectral vectors from a time interval of frames prior to a packet loss event; maintaining a sliding buffer, comprising a number of frames, between the time interval of frames and the packet loss event; generating the linear interpolation for the time interval of frames; using energy of the signal to tag frames within the packet loss event; and inserting values for the packet loss event into the sliding buffer.

In another embodiment, a method to correct for packet loss in an audio signal in automatic speech recognition systems comprising rescoring of phoneme probability calculations for a section of the audio signal is presented, comprising the steps of: accumulating probabilities for a given word in a lexicon; determining when the probabilities are statistically significant; reporting matches when the probabilities are statistically significant; normalizing values of probabilities that are not statistically significant; and rescoring the probabilities for the given word. The normalizing further comprises deleting values for sections of the audio signal comprising packet loss. The normalizing further comprises replacing values for sections of the audio signal comprising packet loss with historical values obtained offline. The audio frames are decomposed into overlapping frames of 20 ms with an overlap factor.

In another embodiment, a method to correct for packet loss in an audio signal in automatic speech recognition systems comprising maximum likelihood prediction wherein the maximum likelihood prediction further comprises the steps of: determining Hidden Markov Model state occupation probabilities in an acoustic model within the automatic speech recognition system prior to a packet loss event; and predicting feature values of packets in the packet loss section of the audio signal based on the determined Hidden Markov Model state occupation probabilities.

DETAILED DESCRIPTION

Figure 1:
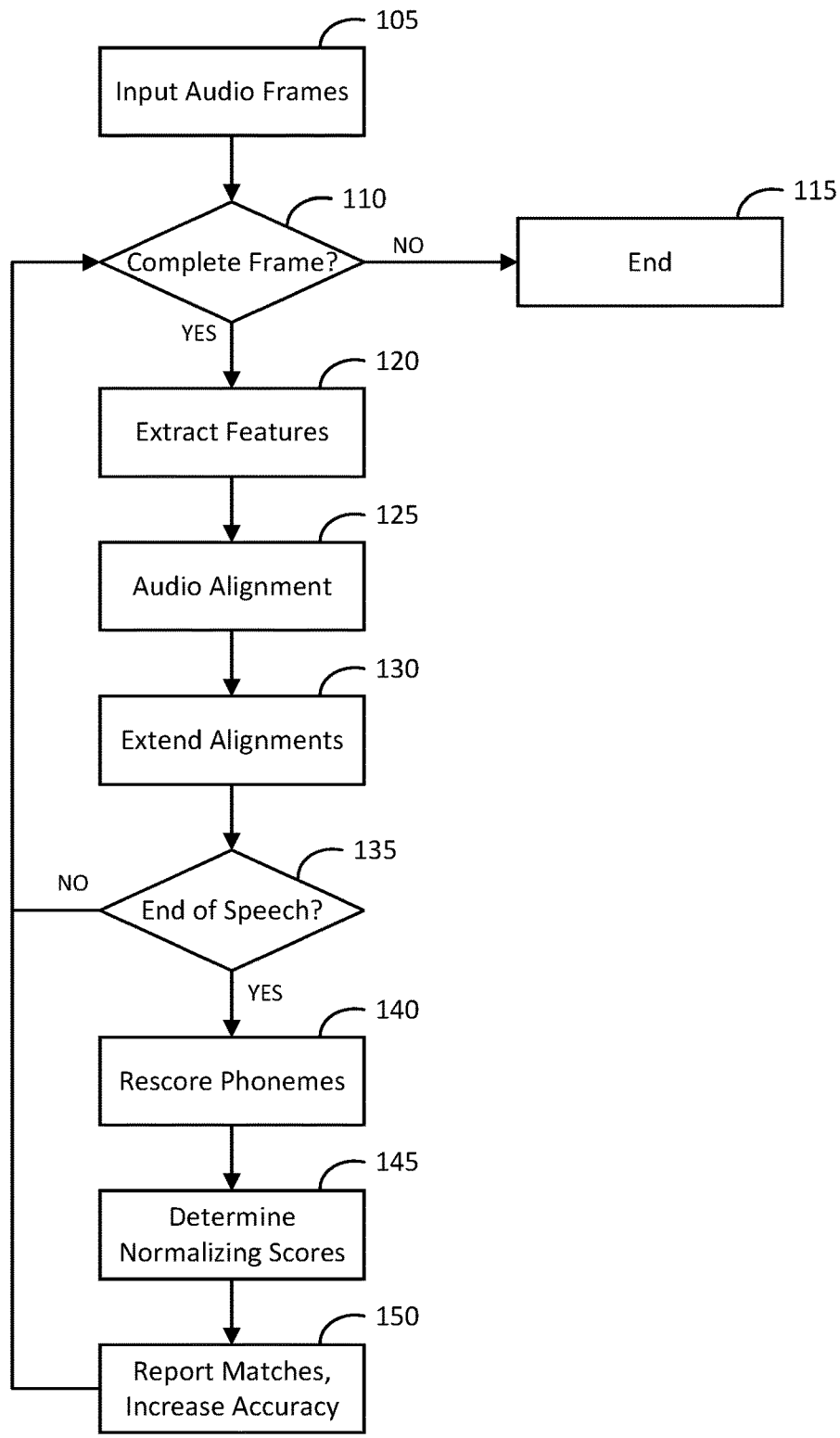
FIG. 1 is a flowchart illustrating an embodiment of a process for phoneme rescoring.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

ASR systems are typically used for recognizing input audio from users for extracting relevant information from the input audio. The relevant information may include digits of a spoken telephone number, keywords in some predefined domain, or, in the case of larger recognition systems, even more complex phrases and sentences. ASR systems use Hidden Markov Models (HMM) whose parameters are trained from a large corpus of known audio data from a specified domain. The recognition of user audio may be made by matching the audio to existing models using efficient methods to streamline the search and cull the number of candidates.

ASR systems generally comprise training units and recognition units. During training, lower dimensional (e.g., 39) feature data is extracted from each audio frame in a large corpus and HMMs are trained for each language unit using this data. Feature data is obtained by first transforming the audio signal into the frequency domain using Fast Fourier Transform (FFT) and performing further transformations. The extracted features are used to train acoustic models that have the same distribution as the training data. Methods from statistics, such as expectation maximization, may be used. During recognition, the extracted features from input audio are matched to the model that maximizes the likelihood of the given feature data. The maximization process is continued for every ensuing frame of audio using an efficient dynamic programming determination. When a statistically significant score is obtained for a word or phrase, a result is reported.

The real-time performance of an ASR system depends on the quality of the models used in training and on the quality of the input audio to be recognized. Audio with large distortions or errors, such as packet loss, results in sharply lower accuracy and degradation in the overall experience. Packet loss, in an embodiment, may be defined as data frames containing zeroes instead of actual transmitted values, in an ASR system.

In VoIP systems, where audio is treated as network data, all traffic occurs in the form of packets. Packet loss is a common source of error caused by router buffer overflows during packet transmission. Correction of packet loss is important for the robustness of the system.

Audio with packet loss or noise will produce poor matches, even to well-trained models, resulting in lower accuracy and high false alarm rates. The embodiments described herein address this problem at the recognition state of the ASR system, without modifying any of the acoustic models generated during training. Prescriptions are provided at different levels: (1) rectification of the actual input signal that is either noisy or consisting of digital silence due to dropped packets, (2) correction in the recognition step where only the recognition scores are normalized to account for signal errors, and (3) replacement of the noisy signal by a best-estimate using information from previous frames and acoustic models.

Embodiments discussed within can be accommodated in ASR systems at two different stages of the ASR engine: processing of the signal obtained prior to the ASR step or directly at the recognition step without any processing of the faulty input signal.

FIG. 1 is a flowchart illustrating an embodiment of a process for phoneme rescoring. The distorted or missing signal is not corrected (except for packet repetition when there is digital silence) but fed directly into the next stage of the ASR engine. The process in FIG. 1 is instead applied towards the very end of the ASR step when phoneme probabilities are calculated and being reported for a section of audio.

In operation 105, audio frames are input. For example, the input comprises audio from users that will be recognized by the ASR system for the extraction of relevant information. Control is passed to operation 110 and the process 100 continues.

In operation 110, it is determined whether or not there is a complete frame in the sequence of input audio frames. If it is determined that there is a complete frame in the sequence of input audio frames, control is passed to operation 120 and the process continues. If it is determined that there is not a complete frame in the sequence of input audio frames, control is passed to operation 115 and the process ends.

The determination in operation 110 may be based on any suitable criteria. In an embodiment, the input audio is segmented into overlapping frames. The frames may be 20 ms in length. Segmentation is performed using a Hamming window and analysis is performed only when a complete frame of audio containing at least 20 ms of data is available.

In operation 120, me 1 frequency cepstral coefficient features are extracted and packet loss is tagged. Packet repetition may be used to calculate features for digital zeros. For example, feature data may be obtained by first transforming the audio signal into the frequency domain using FFT and then performing further transformations using filter banks. In an embodiment, the audio frames used for feature extraction are decomposed into overlapping frames of size 20 ms with an overlap factor of 50%. Control is passed to operation 125 and the process 100 continues.

In operation 125, the audio is aligned. For example, the extracted features from the input audio is matched to the acoustic model that maximizes the likelihood of the given feature data. The tagged packet information may be utilized for the audio alignment. Control is passed to operation 130 and the process 100 continues.

In operation 130, alignments are extended. In an embodiment, the alignments obtained previously are extended using data from the current frame. As every alignment has a probability associated with it, a list of alignments is maintained and constantly extended and pruned with only the best alignments retained at every step. Control is passed to operation 135 and the process 100 continues.

In operation 135, it is determined whether or not speech has ended. If it is determined that speech has not ended, control is passed back to operation 110 and process 100 continues. If it is determined that speech has ended, control is passed to operation 140 and process 100 continues.

The determination in operation 135 may be made based on any suitable criteria. In an embodiment, a voice activity detector may be used for determining whether or not speech has ended.

In operation 140, phonemes are rescored. In an embodiment, previously obtained phoneme scores from a large corpus may be used in the rescoring step by comparing them to the existing phoneme scores. The rescoring strategy simply tags those words or phrases whose confidence values through their scores have been affected by packet loss using tagged packet information from operation 120. Control is passed to operation 145 and process 100 continues.

In operation 145, normalized word scores are determined. In an embodiment, two normalization techniques are used: (1) Phoneme scores are deleted for sections with packet loss and word scores are recalculated excluding dropped sections, and (2) Phoneme scores for lossy sections are replaced with historical values obtained offline and recalculated. Control is passed to operation 150 and process 100 continues.

In operation 150, matches are reported and the accuracy of the system is increased. In an embodiment, the normalized scores from operation 145 are converted to confidence values and matches are reported when confidence exceeds a pre-defined threshold. Control is passed back to operation 110 and process 100 continues.

During normal operation without packet loss, probabilities for a given word in the lexicon are accumulated using the highest scoring tokens for every frame of audio and matches are reported when these scores become statistically significant. Low confidence hits are not reported and count as misses and reduction in false alarms. The effect of packet loss is to reduce the confidence values of many possible matches because of low scores obtained by mismatching faulty audio in certain sections of otherwise high confidence hits. This is especially true when packet loss extends over a short section of a phrase or sentence.

The historical calculation needs the identity of the phoneme that is being normalized and this is possible when a long phoneme has packet loss in a short section. Historical values are previously obtained for each phoneme from a corpus without any packet loss. The effect of both these steps is a big improvement in overall ASR recognition accuracy (2 to 4%) but also triggers additional false alarms. The false alarms are controlled by applying either of the above two normalization methods only to likely candidates and several heuristics are used like value of the token scores, value of token score shifts from previous values, etc.

Figure 2:
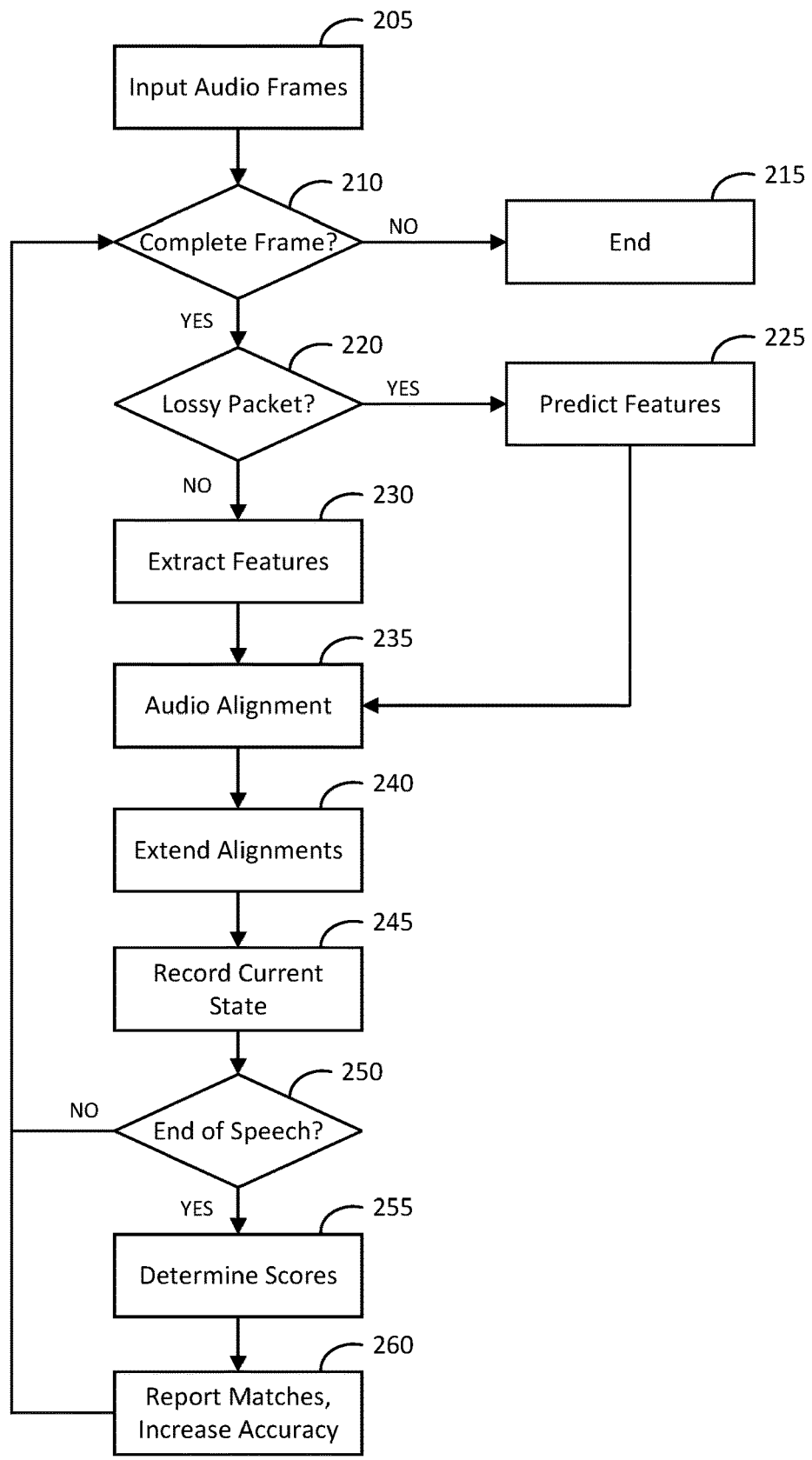
FIG. 2 is a flowchart illustrating an embodiment of a process for determining maximum likelihood.

FIG. 2 is a flowchart illustrating an embodiment of a process for determining maximum likelihood. The HMM state occupation probabilities in the acoustic model just prior to a packet loss event are known and the most likely feature values of the missing packet are predicted conditionally on these values.

In operation 205, audio frames are input. For example, the input comprises audio from users that will be recognized by the ASR system for the extraction of relevant information. Control is passed to operation 210 and the process 200 continues.

In operation 210, it is determined whether or not there is a complete frame in the sequence of input audio frames. If it is determined that there is a complete frame in the sequence of input audio frames, control is passed to operation 220 and the process continues. If it is determined that there is not a complete frame in the sequence of input audio frames, control is passed to operation 215 and the process ends.

The determination in operation 210 may be based on any suitable criteria. In an embodiment, the input audio is segmented into overlapping frames. The frames may be 20 ms in length with some overlapping factor, such as 50%. Segmentation is performed using a Hamming window and analysis is performed only when a complete frame of audio containing at least 20 ms of data is available.

In operation 220, it is determined whether or not the frame is a lossy packet. If it is determined that the frame is a lossy packet, control is passed to operation 225. If it is determined that the frame is not a lossy packet, control is passed to operation 230.

The determination in operation 220 may be based on any suitable criteria. In an embodiment, a voice activity detector may be used for determining packet loss results. Packet loss results in digital zeros in the audio frame.

In operation 225, features are predicted. In an embodiment, the most likely feature values of the succeeding packet are found by maximizing a probability function that is a sum over several Gaussian mixtures with weights given by the state occupation probabilities. A previously trained acoustic model may be utilized in the prediction.

Feature prediction may be determined as follows. Let $x(1), x(2) \ldots x(t)$ represent feature vectors observed until time t just before packet loss at t+1. The probability distribution of the feature vector at $x(t+1)$ may be represented mathematically by:

$$P(x(t+1) \mid x(1), x(2) \ldots x(t)) = \sum_{ik} \text{alpha}(i) t(ik) b(k)(x(t+1))$$

where alpha(i) represents the state occupation probabilities at time t for state (i) (this may also be referred to as the forward variable), where t(ik) represents the state transition probabilities from state i to k, and where b(k)(x(t+1)) represents the Gaussian mixture distribution for the feature x(t+1) from a state k belonging to a phoneme model.

The best estimate for $x(t+1)$ is given by maximizing $P(x(t+1)|x(1), x(2) \ldots x(t))$ over all possible $x(t+1)$. The full maximizing of this function would introduce significant overheads and instead, approximations are used to predict these feature values. Control is passed to operation 235 and the process 200 continues.

In operation 230, me 1 frequency cepstral coefficient features are extracted. For example, feature data may be obtained by first transforming the audio signal into the frequency domain using FFT and then performing further transformations using filter banks. In an embodiment, the audio frames used for feature extraction are decomposed into overlapping frames of size 20 ms with an overlap factor. Control is passed to operation 235 and process 200 continues.

In operation 235, the audio is aligned. For example, the extracted features from the input audio is matched to the acoustic model that maximizes the likelihood of the given feature data. The tagged packet information may be utilized for the audio alignment. Control is passed to operation 240 and process 200 continues.

In operation 240, alignments are extended. In an embodiment, the alignments obtained previously are extended using data from the current frame. As every alignment has a probability associated with it, a list of alignments is maintained and constantly extended and pruned with only the best alignments retained at every step. Control is passed to operation 245 and process 200 continues.

In operation 245, the current state information is recorded. The current state information comprises the most recent state of the forward variable of all the audio alignments and needs to be available as packet loss events are unpredictable. Control is passed to operation 250 and process 200 continues.

In operation 250, it is determined if speech has ended. If it is determined that speech has ended, control is passed to operation 255 and process 200 continues. If it is determined that speech has not ended, control is passed back to operation 210 and the process 200 continues.

The determination in operation 250 may be based on any suitable criteria. In an embodiment, a voice activity detector may be used for determining whether or not speech has ended.

In operation 255, the confidence is determined. Control is passed to operation 260 and the process 200 continues.

In operation 260, matches are reported and the accuracy of the system is increased. In an embodiment, the normalized scores in 255 are converted to confidence values and matches are reported when confidence exceeds a pre-defined threshold. Control is passed back to operation 210 and the process 200 continues.

Figure 3:
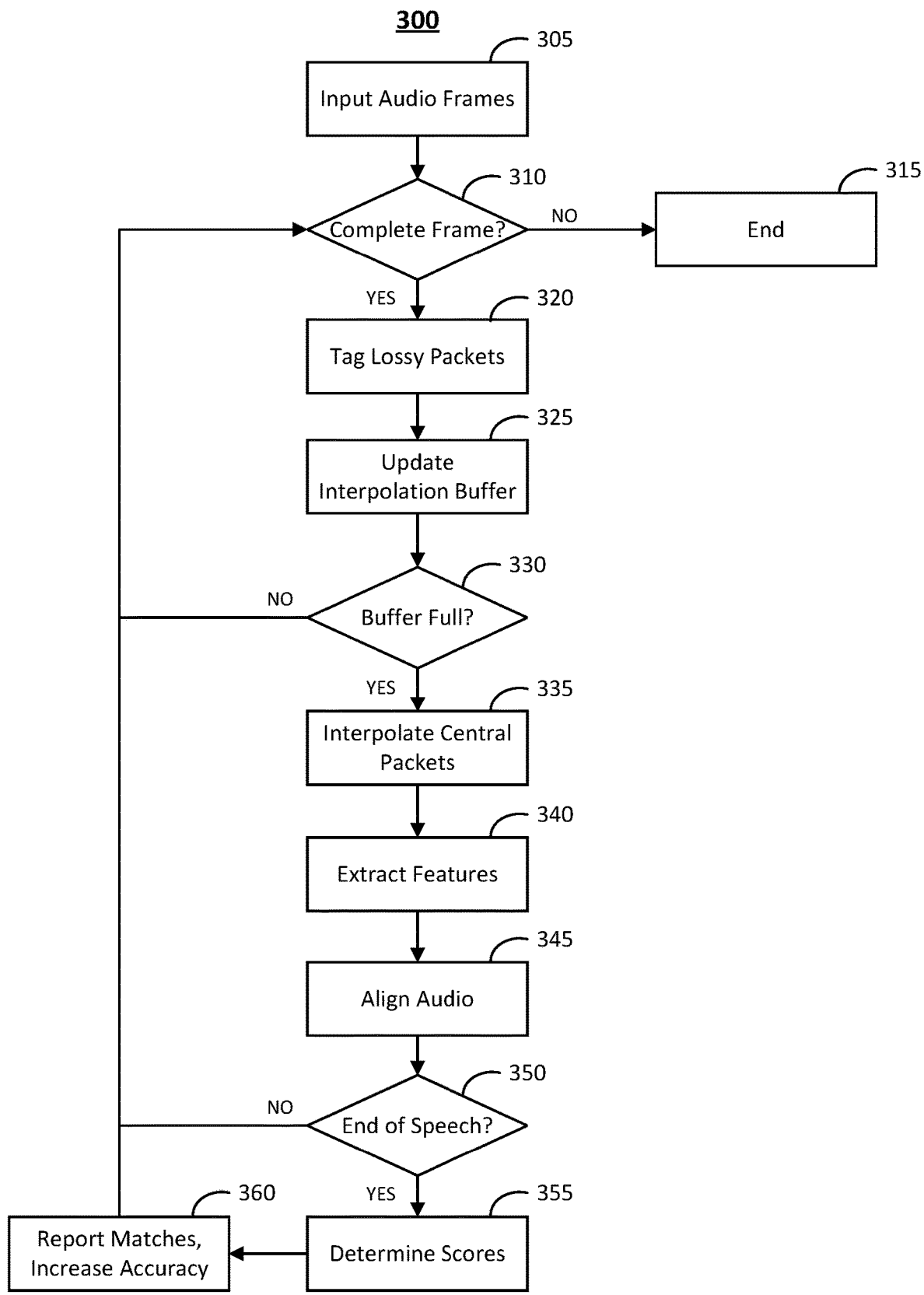
FIG. 3 is a flowchart illustrating an embodiment of a process for determining interpolation.

FIG. 3 is a flowchart illustrating an embodiment of a process for determining interpolation. Speech waveforms are reasonably modeled as the output of linear systems with slowly varying filter parameters. The missing, or distorted, signal is reconstructed using linear interpolation from preceding and succeeding audio frames. Spectral data in the neighboring frames are used to generate linear parameters which are then used to fill in the values in the distorted frames.

In operation 305, audio frames are input. For example, the input comprises audio from users that will be recognized by the ASR system for the extraction of relevant information. Control is passed to operation 310 and the process 300 continues.

In operation 310, it is determined whether or not there is a complete frame in the sequence of input audio frames. If it is determined that there is a complete frame in the sequence of input audio frames, control is passed to operation 320 and the process continues. If it is determined that there is not a complete frame in the sequence of input audio frames, control is passed to operation 315 and the process ends.

The determination in operation 310 may be based on any suitable criteria. In an embodiment, the input audio is segmented into overlapping frames. The frames may be 20 ms in length. Segmentation is performed using a Hamming window and analysis is performed only when a complete frame of audio containing at least 20 ms of data is available.

In operation 320, lossy packets are tagged for the following interpolation operations. In an embodiment, this may be done by checking for digital zeros or zero energy. Control is passed to operation 325 and process 300 continues.

In operation 325, the interpolation buffer is updated. A sliding buffer may be used to correct for packet loss. In an embodiment, a sliding buffer of 10 frames (k=4) to correct for possible packet loss in the central 2 frames is used. The signal energy is then used to tag frames with packet loss and these are differentiated from ordinary silence. In the case of burst losses (defined as more than two successive frames with digital silence) many elements of the buffer are zeros and packet repetition is used to fill in the values in the sliding buffer for the interpolation step. As the buffer slides with more incoming data, corrected values are used to replace lossy values. Control is passed to operation 330 and process 300 continues.

In operation 330, it is determined whether or not the buffer is full. If it is determined that the buffer is full, control is passed to operation 335 and the process 300 continues. If it is determined that the buffer is not full, control is passed back to operation 310 and the process 300 continues.

The determination in operation 330 may be made based on any suitable criteria. In an embodiment, the buffer is full after the first 10 frames are accommodated by discarding the oldest members.

In operation 335, central packets are interpolated. For example, let x(1), x(2) . . . x(t) represent spectral vectors (256 dimensional) until time t before the first packet loss event occurs at time t+1. A buffer is maintained that contains x(t−k+1) . . . x(t), x(t+3), x(t+4) . . . x(t+2+k), 2K+2 frames in all, where k is a small number (e.g. 4). The values of x(t−k+1) . . . x(t), x(t+3) . . . x(t+3+k) are used (2 k in all) to generate a linear interpolation for x(t+1) and x(t+2). In an embodiment, two frames are simultaneously interpolated to keep in step with the keyword spotter.

The interpolation step is optimal when no more than 2 to 3 frames are consecutively zero because there is then enough clean data in the buffer to generate interpolation parameters. The average interpolation error is used to monitor the quality of the interpolation and to decide if it needs to be applied at all. Assuming that the first k frames have no packet loss, the sliding buffer will always have corrected frames in the first half. Control is passed to operation 340 and the process 300 continues.

In operation 340, me 1 frequency cepstral coefficient features are extracted. For example, feature data may be obtained by first transforming the audio signal into the frequency domain using FFT and then performing further transformations using filter banks. In an embodiment, the audio frames used for feature extraction are decomposed into overlapping frames of size 20 ms with an overlap factor. Control is passed to operation 345 and the process 300 continues.

In operation 345, the audio is aligned. For example, the extracted features from the input audio is matched to the acoustic model that maximizes the likelihood of the given feature data. Control is passed to operation 350 and the process 300 continues.

In operation 350, it is determined whether or not the speech has ended. If it is determined that the speech has ended, control is passed to operation 355 and the process 300 continues. If it is determined that the speech has not ended, control is passed back to operation 310 and process 300 continues.

The determination in operation 350 may be made based on any suitable criteria. In an embodiment, a voice activity detector may be used for determining whether or not speech has ended.

In operation 355, the confidence value is determined. Control is passed to operation 360 and process 300 continues.

In operation 360, matches are reported and the accuracy of the system is increased. In an embodiment, the normalized scores in 355 are converted to confidence values and matches are reported when confidence exceeds a pre-defined threshold. Control is passed back to operation 310 and the process 300 continues.

For larger bursts, the interpolation parameters become unreliable and do not yield any improvement over packet repetition. In an embodiment, these parameters may be generated by a minimum least squares approach assuming a linear or quadratic fit. The new spectral parameters are then fed into the next stages of the ASR engine for feature calculation, etc., instead of the old values where packet repetition is used to correct for packet loss. No other additional operations are performed downstream in the ASR engine. The main feature of this approach is directly operating on the spectrum instead of the features. More buffer storage space and processing are needed to handle large dimensional vectors. The effect of this method is a marginal but non-zero improvement in accuracy (0.3%) and no additional false alarms are generated.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method to correct for packet loss in an audio signal in automatic speech recognition systems comprising maximum likelihood prediction wherein the maximum likelihood prediction further comprises the steps of:

a. determining Hidden Markov Model state occupation probabilities in an acoustic model within the automatic speech recognition system prior to a packet loss event, wherein the Hidden Markov Model state occupation probabilities are determined using the mathematical equation $$P(x(t+1) \mid x(1), x(2) \ldots x(t)) = \sum_{ik} alpha(i) t(ik) b(k)(x(t+1))$$

where P represents a probability distribution of a feature vector at x(t+1), alpha(i) represents a state occupation probability at time t for state (i), t(ik) represents a state transition probability from state i to k, and where b(k)(x(t+1)) represents a Gaussian mixture distribution for a feature x(t+1) from a state k belonging to a phoneme model; and b. predicting feature values of packets in the packet loss section of the audio signal based on the determined Hidden Markov Model state occupation probabilities.

2. The method of claim 1, wherein the predicting of the feature values further comprises determining if a feature value is at a first state of the acoustic model and if a next state is at the first state or at a second state.

3. The method of claim 1, wherein the predicting of the feature values further comprises determining if a feature value is at a second state and a next state is in a same state or an other state of the acoustic model.

4. The method of claim 3, wherein the other state of the acoustic model comprises a last state.

5. The method of claim 4, wherein a next state after the last state must be the same state or a first state of a next node in a lexical network.

6. The method of claim 1 wherein audio frames of the audio signal are decomposed into overlapping frames of 20 ms with an overlap factor.

\* \* \* \* \*